(12) United States Patent
Cohen

(10) Patent No.: US 10,692,281 B1
(45) Date of Patent: Jun. 23, 2020

(54) GEM VIEWER

(71) Applicant: Shlomi Cohen, Ramat Gan (IL)

(72) Inventor: Shlomi Cohen, Ramat Gan (IL)

( * ) Notice: Subject to any disclaimer, the term of this patent is extended or adjusted under 35 U.S.C. 154(b) by 0 days.

(21) Appl. No.: 16/351,553

(22) Filed: Mar. 13, 2019

(51) Int. Cl.
*G06T 17/10* (2006.01)
*G06T 7/70* (2017.01)

(52) U.S. Cl.
CPC ............... *G06T 17/10* (2013.01); *G06T 7/70* (2017.01); *G06T 2200/08* (2013.01)

(58) Field of Classification Search
None
See application file for complete search history.

(56) References Cited

U.S. PATENT DOCUMENTS

| 9,836,875 B2 * | 12/2017 | Ying | G06T 15/205 |
| 2010/0250201 A1 * | 9/2010 | Sivovolenko | G01N 21/88 703/1 |
| 2016/0004926 A1 * | 1/2016 | Kerner | H04N 5/23245 348/46 |

* cited by examiner

*Primary Examiner* — Nicholas R Wilson

(57) ABSTRACT

An aspect of some embodiments of the current invention relates to a system for 3D viewing of a gem stone based on 3D image processing technology. Optionally, the views are not based on synthetic modeling of the stone (which may risk producing false images). For example, the system may be based on a standard 3D image processing an array of 2D images at different angles. Optionally, the device takes advantage of standard shapes of diamonds, for example at 16 equally spaced angles around the girdle of a round brilliant cut.

16 Claims, 8 Drawing Sheets

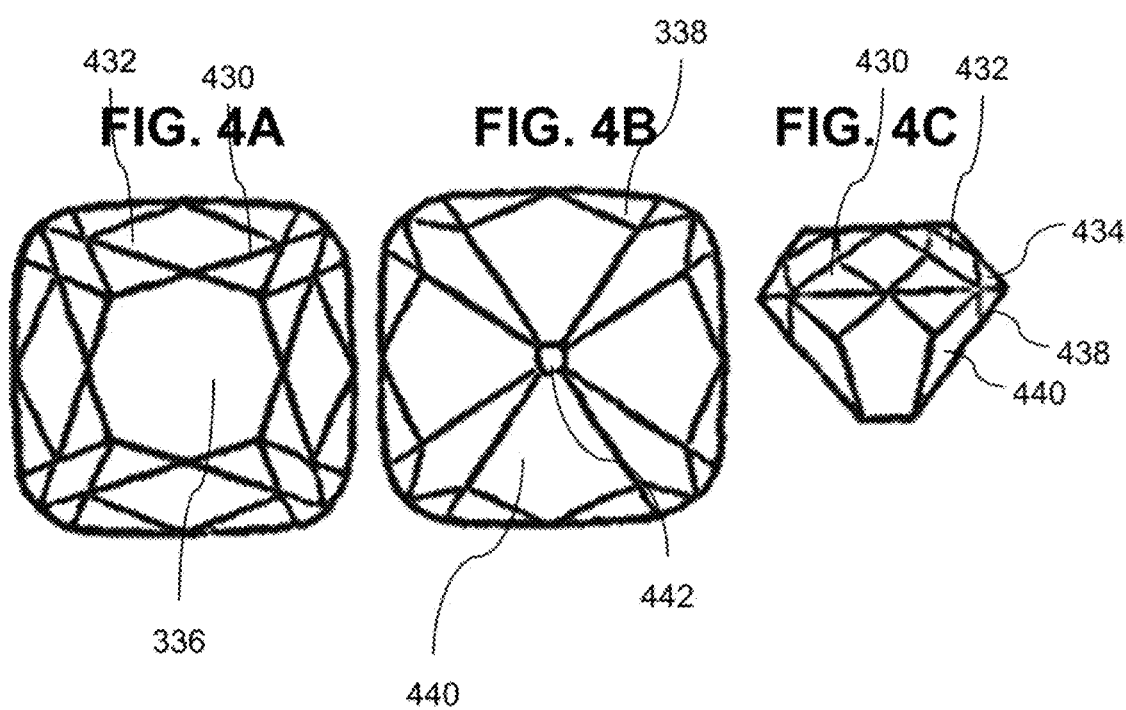

GEM VIEWER

FIELD AND BACKGROUND OF THE INVENTION

The present invention, in some embodiments thereof, relates to a method and system of viewing a gem and more particularly, but not exclusively, to a system for producing a 3D viewable image of a gemstone.

U.S. Pat. No. 9,151,717 appears to disclose, "A method of imaging a cut stone. The method comprises a) identifying an orientation of a cut stone, b) creating a volumetric model of the cut stone according to the orientation, c) capturing a plurality of images of the cut stone from a plurality of viewing angles around the cut stone, d) cropping a plurality of segments depicting the cut stone from the plurality of images using the volumetric model, and e) generating a volumetric image of the cut stone from the plurality of segments."

U.S. Pat. No. 7,436,498 appears to disclose, "An apparatus for determining the shape of a gemstone, including irregularities on its surface, is provided, The apparatus comprises a platform adapted to support the gemstone, a scanning system adapted to provide geometrical information concerning the three-dimensional convex envelope of the gemstone, an illumination system adapted to project on the gemstone a plurality of laser beams, an imaging system adapted to capture reflections of at least a part of said laser beams from the surface of the gemstone, and a processor. The processor is adapted to calculate, based on said geometrical information, a predicted reflection of each laser beam, to compare the captured reflections with said predicted reflections and to relate each captured reflection to its corresponding predicted reflection, to determine said shape of the gemstone based on the comparison and said geometrical information"

SUMMARY

According to an aspect of some embodiments of the invention, there is provided a method for producing a 3D image of a gem including: defining a predetermined set of viewing angles of the gem and lighting angles; placing the gem in a first orientation; imaging the gem from a first subset of the set of viewing angles; reorienting the gem is a second orientation; further imaging the gem from a second subset of the set of viewing angles; and storing results of the imaging and the further imaging in a standard format for reading by a graphics viewing application.

According to some embodiments of the invention, the defining is in accordance with a cut of the gem.

According to some embodiments of the invention, the method includes selecting a set of viewing angles in accordance to the cut from a plurality of sets of viewing angles, each set of the plurality of sets of viewing angles is associated with a standard cut of a gem.

According to some embodiments of the invention, the method further includes: determining a preferred view of the gem and also imaging the gem at the preferred view.

According to some embodiments of the invention, the preferred view is identified by a person examining the gem.

According to some embodiments of the invention, the preferred view is identified based on images.

According to some embodiments of the invention, the preferred view is identified based on images made by an imager of the imaging between images of the imaging.

According to some embodiments of the invention, the preferred view is identified based on data from a sensor collected during the imaging.

According to some embodiments of the invention, the also imaging is in addition to the imaging and the further imaging.

According to some embodiments of the invention, the first subset is modified to include the preferred view.

According to some embodiments of the invention, the method further includes: keeping a lighting stationary in respect to the gem during the imaging.

According to some embodiments of the invention, the method further includes: keeping a lighting stationary with respect to a viewing angle during the imaging.

According to some embodiments of the invention, the method further includes: keeping a lighting stationary in respect to the gem during the reorienting.

According to some embodiments of the invention, the method further includes: keeping a lighting stationary with respect to a viewing angle during the reorienting.

According to some embodiments of the invention, the cut is a round brilliant and the set of views includes views at 16 equally spaced point around a girdle of the gem.

According to some embodiments of the invention, the cut is a round brilliant and the set of views includes views at 4 points across a crown of the gem.

According to some embodiments of the invention, the first subset includes view differentials and wherein an initial view for the imaging is selected such that a preferred view will be included in the imaging.

According to an aspect of some embodiments of the invention, there is provided a method of viewing a gem including: supplying a plurality of views of the gem in a standard format configured for a graphics viewing application; using a standard graphics routing interface to manipulate a view of the gem to an arbitrary angle and interpolating the plurality of views using the standard graphics routine to view an image of the gem at the arbitrary angle.

Some embodiments of the invention are herein described, by way of example only, with reference to the accompanying drawings. With specific reference now to the drawings in detail, it is stressed that the particulars shown are by way of example and for purposes of illustrative discussion of embodiments of the invention. In this regard, the description taken with the drawings makes apparent to those skilled in the art how embodiments of the invention may be practiced.

BRIEF DESCRIPTION OF THE SEVERAL VIEWS OF THE DRAWING(S)

Some embodiments of the invention are herein described, by way of example only, with reference to the accompanying drawings. With specific reference now to the drawings in detail, it is stressed that the particulars shown are by way of example and for purposes of illustrative discussion of embodiments of the invention. In this regard, the description taken with the drawings makes apparent to those skilled in the art how embodiments of the invention may be practiced.

FIGS. 4A-4C are schematic illustrations of an embodiment of a brilliant square cut diamond;

DESCRIPTION OF SPECIFIC EMBODIMENTS OF THE INVENTION

Figure 1:
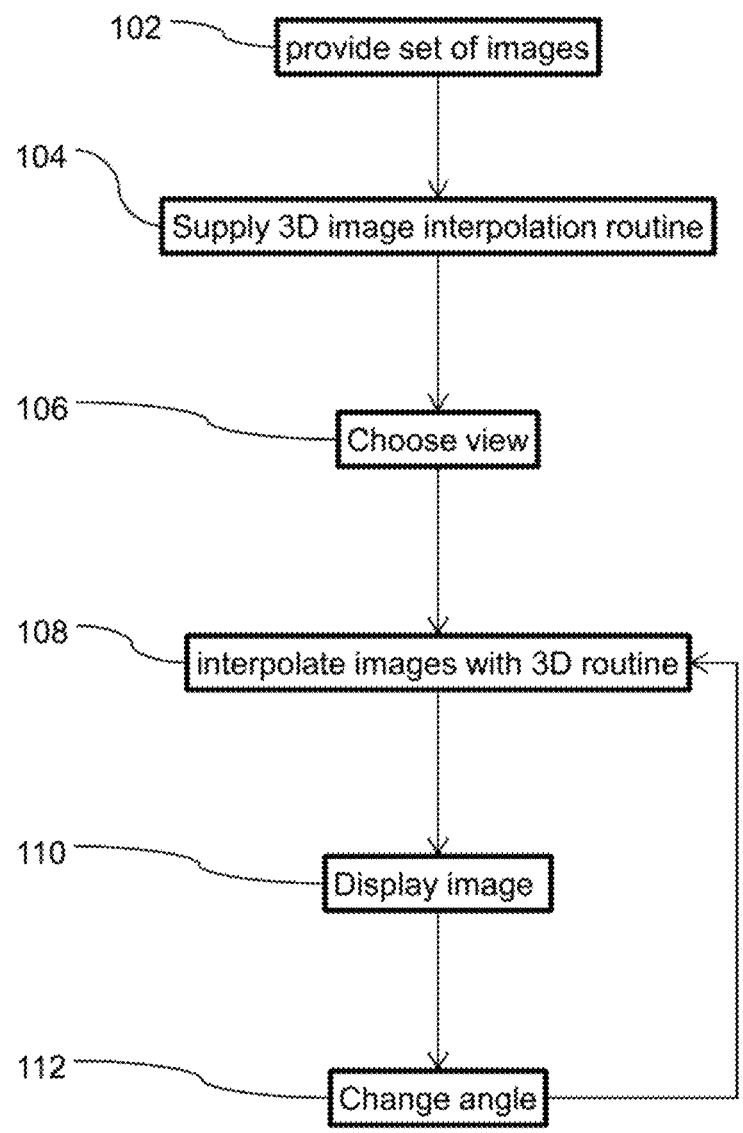
FIG. 1 is a flow chart of viewing a gem in accordance with an embodiment of the current invention.

The present invention, in some embodiments thereof, relates to a method and system of facilitating parking and more particularly, but not exclusively, to a system for reserving parking spaces in a public lot. In some embodiments, a parking system reduces congestion in and/or increases revenue is urban areas.

Overview

An aspect of some embodiments of the current invention relates to a system for 3D viewing of a gem based on 3D image processing technology. Optionally, the views are not based on synthetic modeling of the stone (which may risk producing false images). For example, the system may be based on a standard 3D image processing an array of 2D images at different angles. Optionally, the device takes advantage of standard shapes of diamonds, for example at 16 equally spaced angles around the girdle of a round brilliant cut.

Specific Embodiments

Before explaining at least one embodiment of the invention in detail, it is to be understood that the invention is not necessarily limited in its application to the details of construction and the arrangement of the components and/or methods set forth in the following description and/or illustrated in the drawings and/or the Examples. The invention is capable of other embodiments or of being practiced or carried out in various ways.

FIG. 1 is a flow chart of viewing a diamond in accordance with an embodiment of the current invention. In some embodiments, a set of images is provided 102 showing a plurality of 2D views of a gem in three-dimensions. Optionally, the image set is in a standard format for a generic graphics image interpolation system. A user optionally chooses 106 a view angle (for example using a graphic user interface) and the 3D image interpolation routine optionally interpolates 104 between images 108 generates an image and/or displays 110 the image of the gem at the angle using 3D image interpolation. Optionally, the user chooses a view 106 and/or may change 112 the viewing angle and view the gem at the new angle. Optionally, the user chooses a view 106 and/or may change 112 the lighting angle, color and/or intensity and view the gem with a new lighting. For example, the set of images may include images with different lighting and/or the image processing routine may interpolate between different lighting regimes.

In some embodiments, the user may also adjust the lighting angle. For example, the set of images may include images from different angles and/or images that are lit from different angles. For example, the images may be prepared in accordance to embodiments described herein below. In some embodiments, a default and/or preferred view may be available to the user. Optionally the views of a set of images may contain a set of angles that is configured according a standard cut of the gem. For example, for a round brilliant cut gem there may be 16 equally spaced angular views around the girdle of the gem. For example, for a rectangular, brilliant and/or an oval and/or a heart shaped cut, the angular sections may not be equally spaced.

Figure 2A:
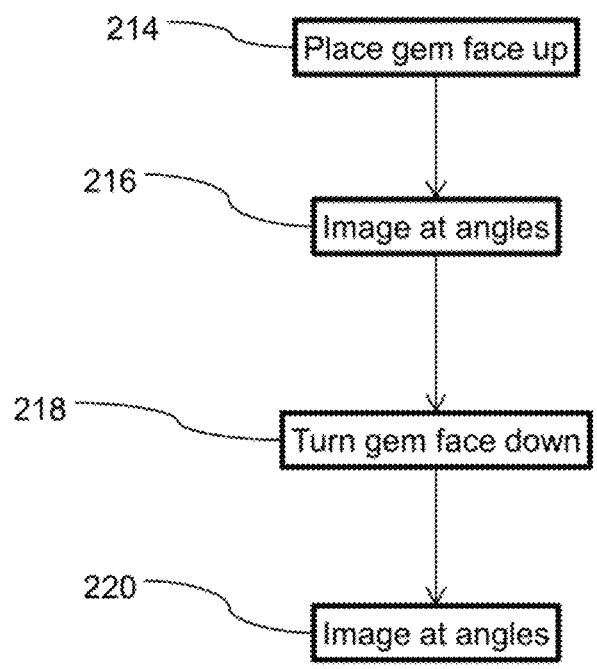
FIGS. 2A and 2B are a flow chart illustration of imaging a gem in accordance with an embodiment of the current invention.
Figure 2B:
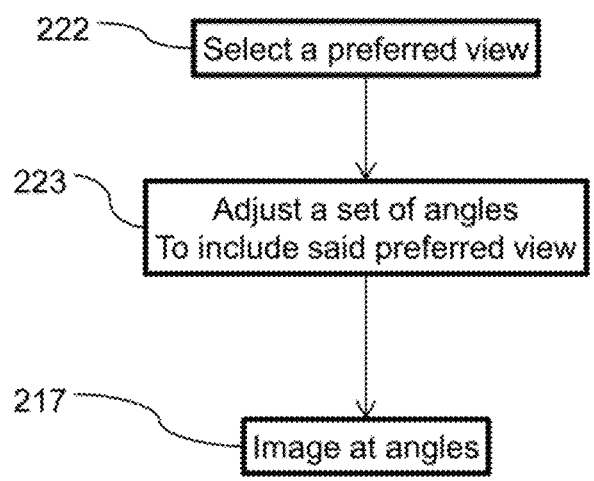

FIGS. 2A and 2B are flow chart illustrations of imaging a diamond in accordance with an embodiment of the current invention. In some embodiments a gem is placed 214 on a mount and imaged 216 from a plurality of angles. For example, the imaging angles and/or the differences between angles in different views may be predetermined. Optionally, the gem orientation is changed 218 (for example reversed to an opposite orientation) and imaged 220 again from a plurality of directions. Optionally, imaging directions may be the same for opposite sides off the gem. Alternatively or additionally, there may be different angles and/or numbers of angles for different sides of the gem. For example, a top face of the gem may be imaged at more angles than a bottom face. Additionally or alternatively, the lighting of the gem may be varied.

In some embodiments, the viewing angles are in accordance to the cut of the gem. For example, a symmetric gem may be imaged 216, 220 over a symmetric set of angles. Alternatively or additionally, a set of angles may be adjusted to catch different optical effects. For example, along with and/or instead of a standard set of viewing angles, the gem may be imaged 216, 220 at a preferred angle and/or a set of random angles and/or different angles with respect to the faces of the gem for example to illustrate different effects of light and/or viewing angle. For example, a top face of a round brilliant cut gem may be imaged 216 at 16 angles around the girdle of the gem and/or 4 angles across the crown (e.g. 64 images). Optionally the images will be equally spaced angularly and/or will be angled at similar angular positions to the faces of the gem. Optionally the bottom of the gem will be imaged 220 over 64 angles like the top of the gem. Alternatively or additionally, the bottom of the gem may be imaged 220 at a different number (e.g. fewer) of angles.

In some embodiments, the lighting will remain at the same angle with respect to the gem over different viewing angles (for example, illustrating the gem from different angles for a non-moving gem). Alternatively or additionally, the lighting will remain stationary with respect to the viewing angle (for example illustrating the effect of rotating the gem as will the viewer remains stationary). For example, when the top of the gem is imaged, light may be supplied from above and/or when the gem is turned over and the bottom is imaged, light may be supplied from below. For example, the gem may be supported by a transparent and/or translucent mount. Optionally or additionally a background may be supplied, for example the background may be dark. Alternatively or additionally, a different lighting and/or background may be used for different views. For example, for the top view a dark background may be used and/or for the bottom view a light background may be used.

In some embodiments, a preferred angle will be chosen. For example, the preferred angle will be selected 222 as an initial angle and imaging 217 will be performed based on angular changes adjusted 223 to the preferred angle (e.g. 16 girdle angles will be selected equally around the gem starting at the preferred angle). Alternatively or additionally, a set of standard angles may be used to image 216, 220 the gem and/or imaging 216, 220 may additionally include one or more preferred angles. For example, a preferred angle may be an angle at which a gem sparkles (for example images may be added at the sparkle and/or near the sparkle angle such that as the viewer turns the virtual stone it sparkles (e.g. flashes when passing the virtual angle of the sparkle and/or goes dark again as the angle changes slightly). Alternatively or additionally, a preferred angle may be an angle at which a gem appears particularly beautiful (e.g. for a hearts and arrow cut gem, the preferred angle may be an angle at which the hearts and/or arrows are clearly seen).

Figure 3A:
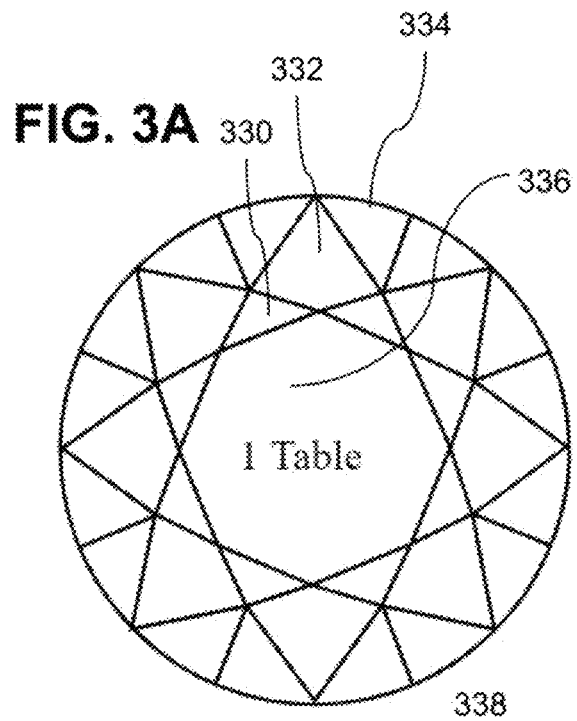
FIGS. 3A-3B are schematic illustrations of an embodiment of a round brilliant cut diamond; in accordance with an embodiment of the current invention
Figure 3B:
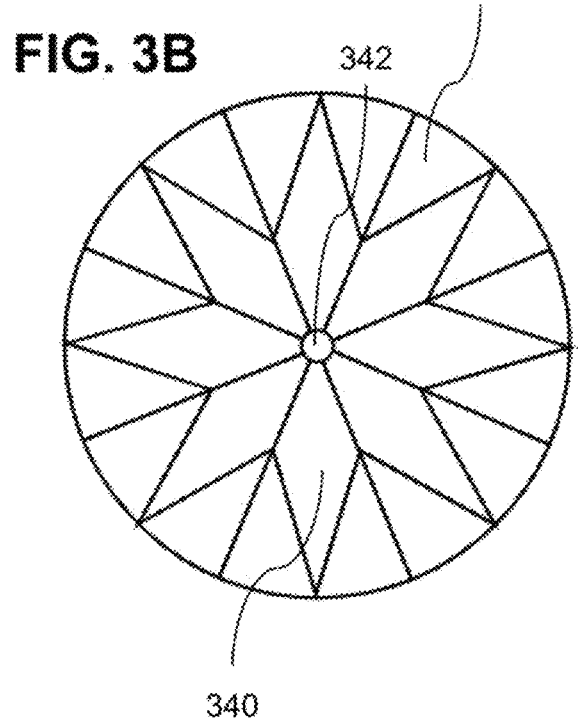

FIGS. 3A-3B are schematic top view and bottom view illustrations of an embodiment of a round brilliant cut diamond in accordance with an embodiment of the current invention. It can be seen that the top of the gem optionally has 16 upper girdle facets 334 defining 16 angles along the face. The table 336 is optionally octagonal and/or borders 8 kite facets 332 and/or 8 star facets 330. The bottom of the gem optionally includes 16 lower girdle facets 338 and/or 8 pavilion main facets 340. Optionally the bottom may includes a culet 342. The resulting gem has 16 equally spaced girdle viewing angles and/or 8 table viewing angles. In some embodiments, a round brilliant cut gem may be imaged from 16 girdle angles (e.g. azimuth angles). In some embodiments, the crown of the stone has 4 levels (facet angles moving across the crown, for example the angle of the upper girdle facets, the angle of the kite facets, the angle of the star facets and/or the angle of the table). Optionally, the crown (top face) of a brilliant cut gem may be imaged from 4 angles (e.g. zenith angles). For example, the zenith angles may be equally distributed (e.g. at 45 degree intervals and/or at 60 degree intervals). Alternatively or additionally, the zenith angle may be divided like the faces of the gem (e.g. one at between 0 to 35 degrees [the girdle and upper girdle facets], one at between 30 to 40 degrees [the kite facets], one between 40 to 70 degrees [the star facets] and one between 70 to 90 degrees [the table]). The bottom face is optionally imaged over 8 or 16 girdle angles and/or between 2 to 4 zenith angles (e.g. either the same angles as the crown and/or fewer angles fitting to the fewer facets and/or equally divided). Optionally, preferred views may be added and/or the initial angle may be adjusted according to a preferred view.

FIGS. 4A-4C are schematic illustrations of the top, bottom and side of an embodiment of a brilliant square cut diamond. For example, this cut shows 16 unequal divisions of girdle angles. It can be seen that the top of the gem optionally has 16 upper girdle facets 434 defining 16 angles along the face. The table 436 is optionally octagonal and/or borders 8 kite facets 432 and/or 8 star facets 430. The bottom of the gem optionally includes 16 lower girdle facets 438 and/or 8 pavilion main facets 440. Optionally the bottom may includes a culet 442. Optionally this gem may be imaged at its natural angles (e.g. 8 or 16 unequal girdle divisions in accordance to its facets) and/or in equal divisions (e.g. 8 or 16 equal girdle divisions). Optionally this gem may be viewed over the top and/or bottom in between 2 to 4 equal and/or unequal zenith angles.

Figure 5:
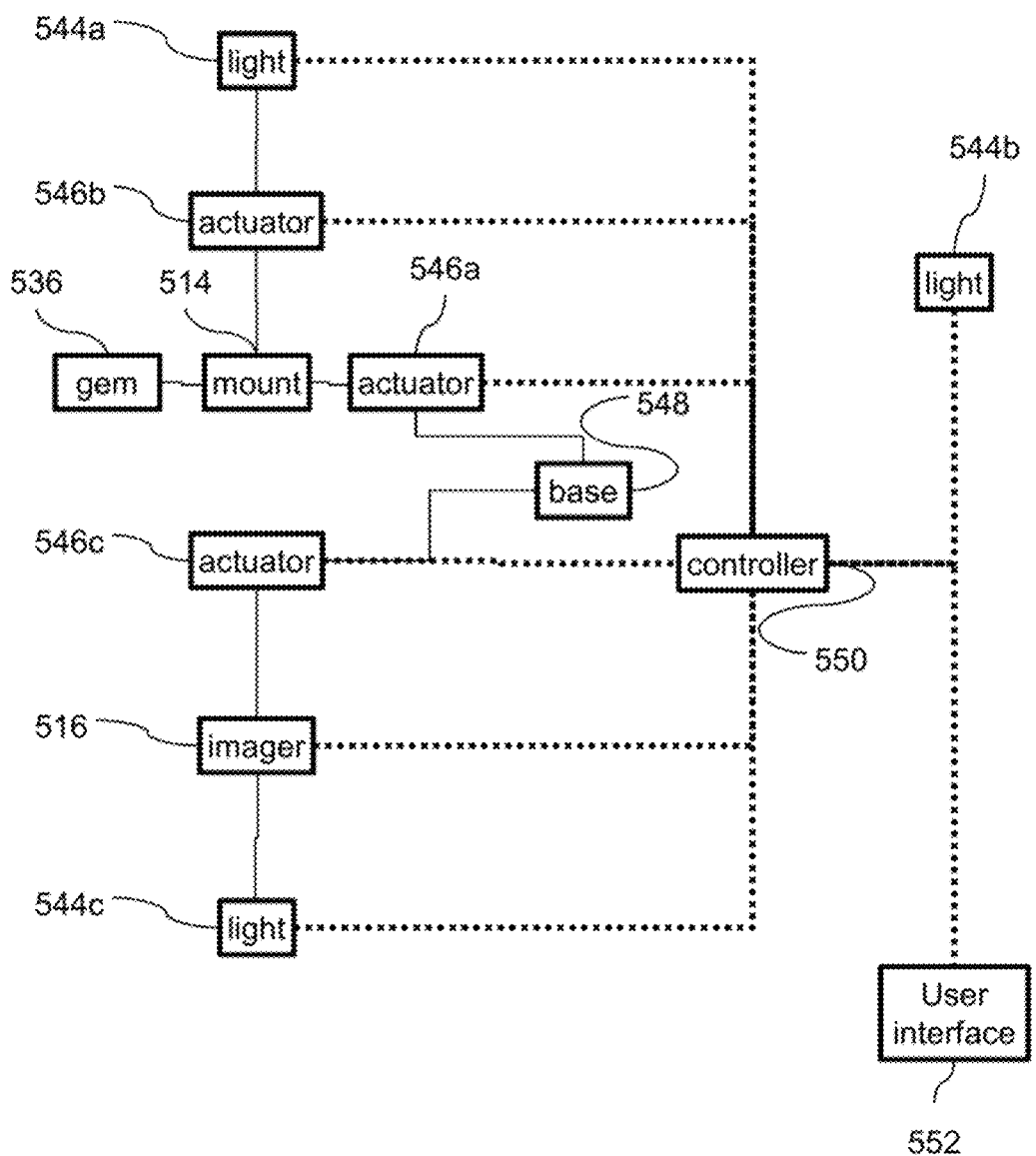
FIG. 5 is a block diagram of a diamond imager system in accordance with an embodiment of the current invention.

FIG. 5 is a block diagram of a diamond imager system in accordance with an embodiment of the current invention. In some embodiments, an imager 516 (for example a digital camera) is used to image a gem 536 held on a mount 514. Optionally, a controller 550 (for example including a processor and/or memory and/or device interfaces and/or sensor interfaces) controls the angle of view of gem 536 by imager 516 and/or lighting. Additionally or alternatively, controller 550 may receive sensor data and/or user input to decide a preferred view and/or decide angles of views to image.

In some embodiments, mount 514 may be connected by an actuator 546a to a stationary base 548. For example, actuator 546a, may receive commands from controller 550 to position mount 514 and/or gem 536 at a desired angle for imaging. For example, actuator 546a may rotate gem 536 in the horizontal plane (e.g. changing the azimuth angle). Additionally or alternatively, imager 516 is also connected to base 548 via an actuator 546c. For example, actuator 546c may control the zenith angle of an image according to commands from processor 550. Optionally, a light source 544a may be supplied that is connected to and/or moves with mount 514. For example, the lighting may remain fixed with respect to gem 536 as the view angle changes. Optionally, an actuator 646b may change the angle between light source 544a and gem 536, for example, under control of controller 550. Alternatively or additionally, a light source 544c may be connected to imager 516. For example, as imager 516 moves, the light direction may be fixed with respect to the imager 516. Optionally, an actuator may be supplied to control the angle and/or position of light 544c with respect to imager 516, for example under control of controller 550. Alternatively or additionally, there may be one or more light sources 544b that are fixed with respect to the base 548. Alternatively or additionally, a light source 544b may move independently of images 516 and/or mount 514. For example, the light source 544b may be attached to mount 514 via an actuator. Optionally, controller 550 may turn on and off and/or change intensity and/or color of various light sources 544a, 544b, 544c. In some embodiments a user interface 552 is supplied to control controller 550. Optionally controller 550 may be controlled remotely (for example over a network). Optionally, a remote supervisor may see images of the system and/or the gem 536 and/or control the viewing position and/or lighting.

Figure 6A:
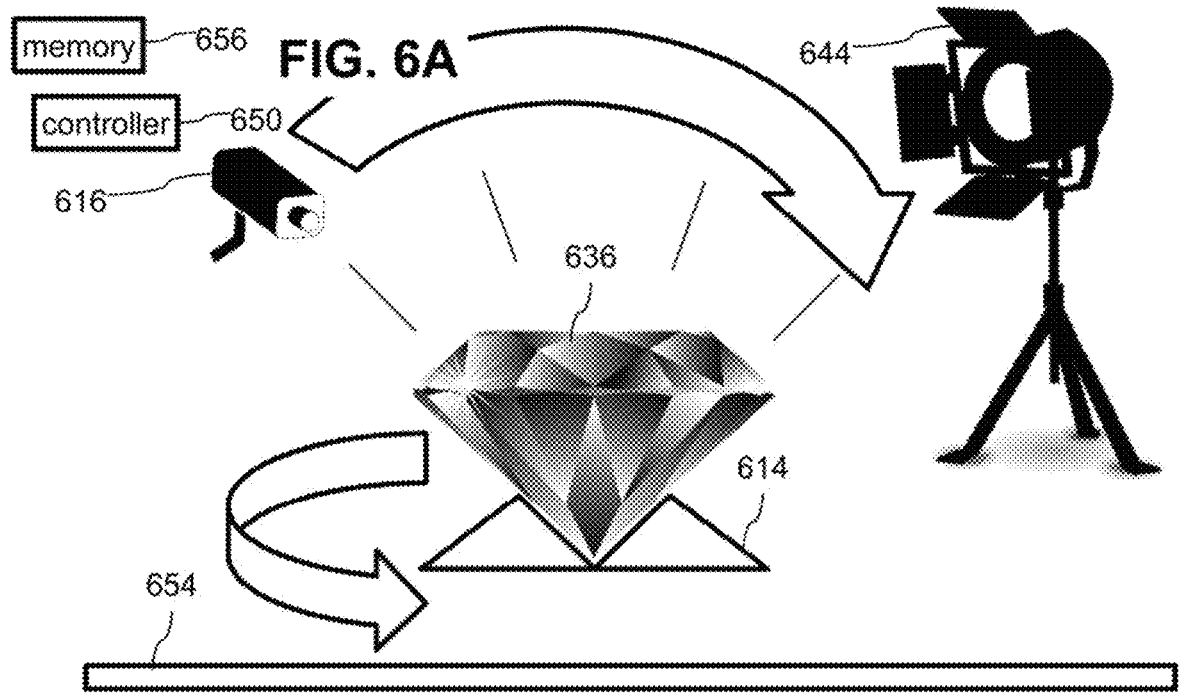
FIGS. 6A-6B are schematic illustrations of an embodiment of a brilliant round cut diamond positioned on a mount crown up (FIG. 6A) and inverted crown down (FIG. 6B) in accordance with an embodiment of the current invention.
Figure 6B:
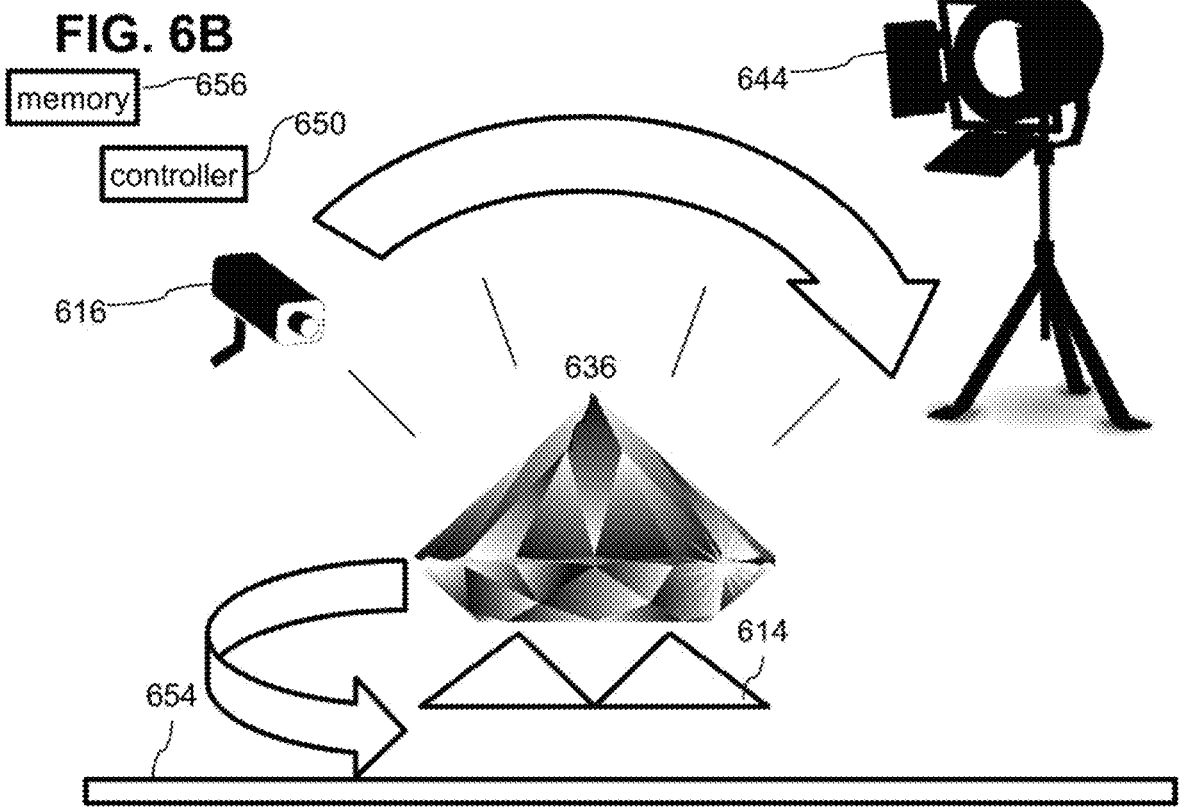

FIGS. 6A-6B are schematic illustrations of an embodiment of a brilliant round cut diamond 636 positioned on a mount 614 crown up (FIG. 6A) and inverted crown down (FIG. 6B) in accordance with an embodiment of the current invention. In some embodiments, one face of a gem may be imaged and then inverted and imaged from the opposite face. Optionally, during viewing the 2D images are stitched together to produce a smooth 3D viewing experience, for example, by image interpolation. Optionally, a background 654 and/or lighting 644 may remain fixed as the gem is inverted. Alternatively or additionally, the lighting 644 and/or background 654 may be inverted for example to keep the lighting 644 and/or background 654 consistent with respect to the gem over the set of views. For example, from view to view, the mount 614 and/or gem may be moved. Alternatively or additionally, from view to view, the imager 616 may be moved. Alternatively or additionally, from view to view, the lighting 644 may be changed. Alternatively or additionally, from view to view, the background 654 may be changed. Optionally, views, lighting 644 and/or the background 654 may be controlled by controller 650 for example including a processor and/or a memory 656 and/or a network connection and/or a user interface.

Figure 7A:
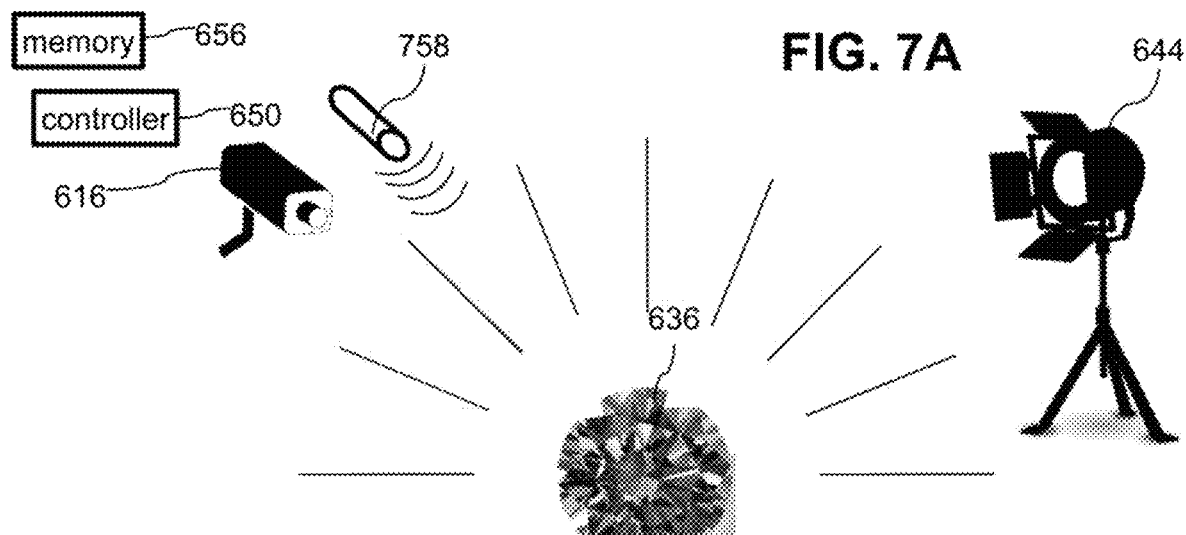
FIGS. 7A-7B are schematic illustrations of an embodiment of a brilliant round cut diamond positioned on a mount crown up (FIG. 7A) and inverted crown down (FIG. 7B)
Figure 7B:
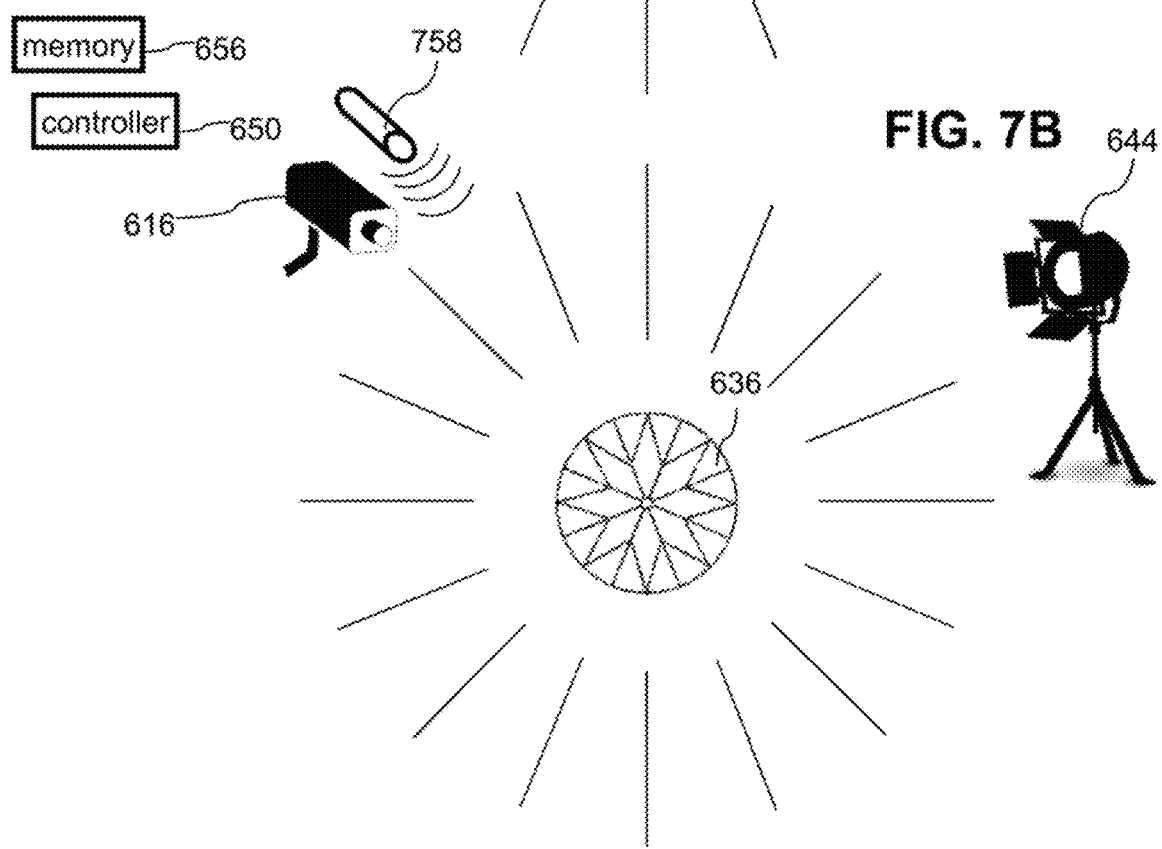

FIGS. 7A-7B are schematic illustrations of an embodiment of a brilliant round cut diamond 636 positioned on a mount crown up (FIG. 7A) and inverted crown down (FIG. 7B). In some embodiments, a system may include a sensor 758. For example, sensor 758 may be used by a controller 650 determine the type of cut and/or type of gem and/or its position. Optionally, the sensor 758 may register flashes of light and color from the gem and/or choose a preferred view and/or one or more defining views (for example for a view that produces a flash of color at a particular angle, images may be taken at the particular angle and/or at nearby angles where the flash isn't present such that when a viewer pans across the gem he see the flash in the interpolated 3D images). In some embodiments, a controller 650 may receive images from imager 616 and/or use the images to determine a preferred view and/or a type of gem and/or a cut of the gem and/or a preferred lighting etc. In some embodiments, an imaging system may make a large number of images over a large number of angles as the gem is moved and/or as the imager moves and/or as the lighting changes. As the images are being made and/or afterwards, a controller and/or a human supervisor may select certain views and/or images and/or package them for viewing with a 3D image processing system.

Figure 8:
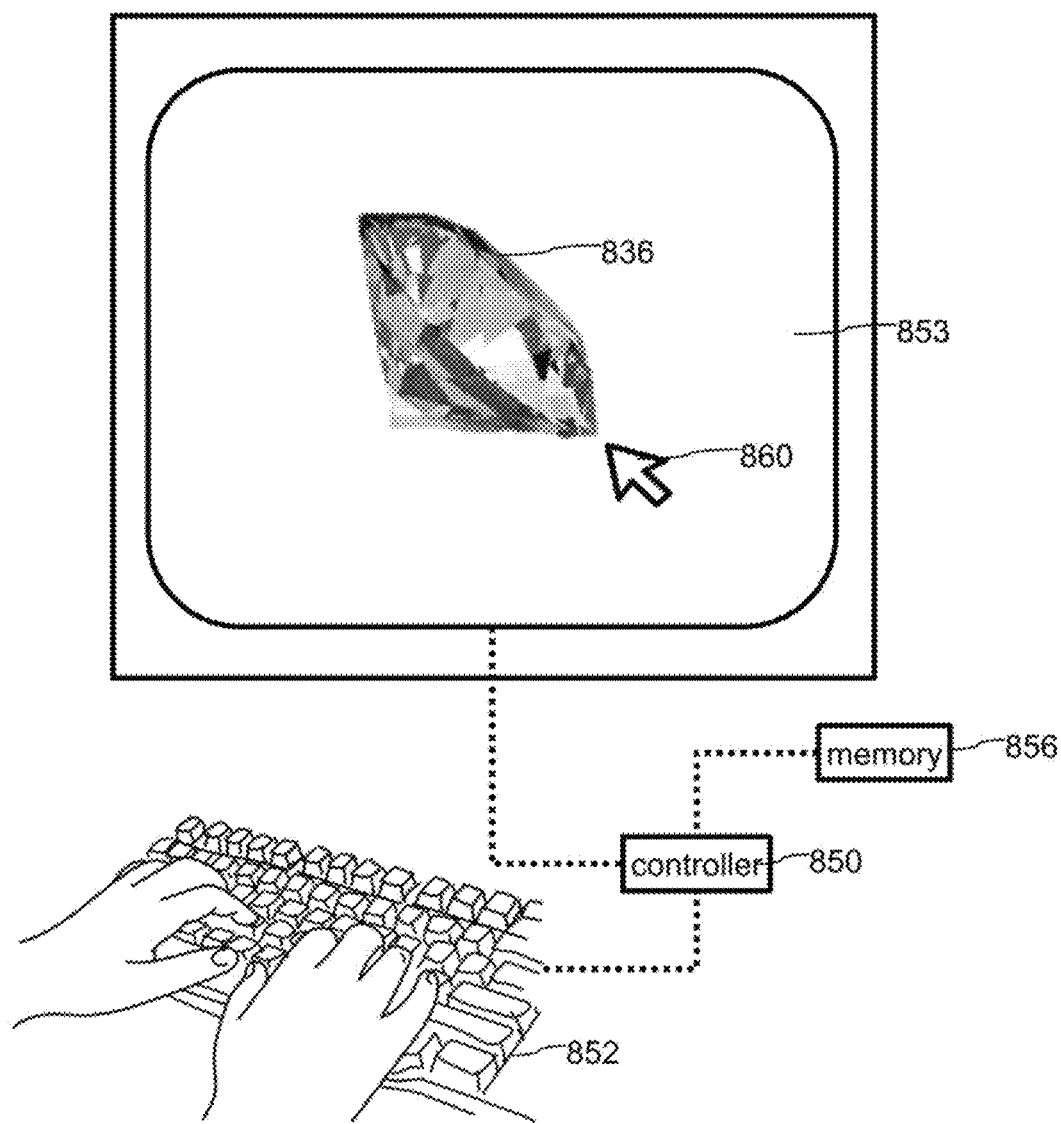
FIG. 8 is a schematic illustration of an embodiment of a diamond viewer in accordance with an embodiment of the current invention.

FIG. 8 is a schematic illustration of an embodiment of a diamond viewer in accordance with an embodiment of the current invention. In some embodiments, a plurality of 2D images of a gem 836 are stored on a memory 856 in a digitized format. Optionally, a controller 850 interpolates images in 3D and displays them on a display device 853. Optionally a user interface 852 is supplied by which the user can control the view. For example, the input and/or viewing interface may include a touch screen and/or a view screen, a pointer 860 and/or a pointing device and/or keyboard 852. Optionally images may be stored in a standard format and/or image processing may use simple standard software. For example, the images may include a packaged set of 2D images as produced by any of the imaging embodiments disclosed herein above. Alternatively or additionally, 3D modeling software may be used.

General

It is expected that during the life of a patent maturing from this application many relevant building technologies, artificial intelligence methodologies, computer user interfaces, image capture devices will be developed and the scope of the terms for design elements, analysis routines, user devices is intended to include all such new technologies a priori.

Unless otherwise defined, all technical and/or scientific terms used herein have the same meaning as commonly understood by one of ordinary skill in the art to which the invention pertains. Although methods and materials similar or equivalent to those described herein can be used in the practice or testing of embodiments of the invention, exemplary methods and/or materials are described below. In case of conflict, the patent specification, including definitions, will control. In addition, the materials, methods, and examples are illustrative only and are not intended to be necessarily limiting.

As will be appreciated by one skilled in the art, some embodiments of the present invention may be embodied as a system, method or computer program product. Accordingly, some embodiments of the present invention may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, some embodiments of the present invention may take the form of a computer program product embodied in one or more computer readable medium(s) having computer readable program code embodied thereon. Implementation of the method and/or system of some embodiments of the invention can involve performing and/or completing selected tasks manually, automatically, or a combination thereof.

Moreover, according to actual instrumentation and equipment of some embodiments of the method and/or system of the invention, several selected tasks could be implemented by hardware, by software or by firmware and/or by a combination thereof, e.g., using an operating system.

For example, hardware for performing selected tasks according to some embodiments of the invention could be implemented as a chip or a circuit. As software, selected tasks according to some embodiments of the invention could be implemented as a plurality of software instructions being executed by a computer using any suitable operating system. In an exemplary embodiment of the invention, one or more tasks according to some exemplary embodiments of method and/or system as described herein are performed by a data processor, such as a computing platform for executing a plurality of instructions. Optionally, the data processor includes a volatile memory for storing instructions and/or data and/or a non-volatile storage, for example, a magnetic hard-disk and/or removable media, for storing instructions and/or data. Optionally, a network connection is provided as well. A display and/or a user input device such as a keyboard or mouse are optionally provided as well.

Any combination of one or more computer readable medium(s) may be utilized for some embodiments of the invention. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electromagnetic, optical, or any suitable combination thereof. A computer readable signal medium may be any computer readable medium that is not a computer readable storage medium and that can communicate, propagate, or transport a program for use by or in connection with an instruction execution system, apparatus, or device.

Program code embodied on a computer readable medium and/or data used thereby may be transmitted using any appropriate medium, including but not limited to wireless, wireline, optical fiber cable, RF, etc., or any suitable combination of the foregoing.

Computer program code for carrying out operations for some embodiments of the present invention may be written in any combination of one or more programming languages, including an object-oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Some embodiments of the present invention may be described below with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general-purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

Some of the methods described herein are generally designed only for use by a computer, and may not be feasible or practical for performing purely manually, by a human expert. A human expert who wanted to manually perform similar tasks might be expected to use completely different methods, e.g., making use of expert knowledge and/or the pattern recognition capabilities of the human brain, which would be vastly more efficient than manually going through the steps of the methods described herein.

As used herein the term "about" refers to ±20%

The terms "comprises", "comprising", "includes", "including", "having" and their conjugates mean "including but not limited to".

The term "consisting of" means "including and limited to".

The term "consisting essentially of" means that the composition, method or structure may include additional ingredients, steps and/or parts, but only if the additional ingredients, steps and/or parts do not materially alter the basic and novel characteristics of the claimed composition, method or structure.

As used herein, the singular form "a", "an" and "the" include plural references unless the context clearly dictates otherwise.

Throughout this application, various embodiments of this invention may be presented in a range format. It should be understood that the description in range format is merely for convenience and brevity and should not be construed as an inflexible limitation on the scope of the invention. Accordingly, the description of a range should be considered to have specifically disclosed all the possible subranges as well as individual numerical values within that range. For example, description of a range such as from 1 to 6 should be considered to have specifically disclosed subranges such as from 1 to 3, from 1 to 4, from 1 to 5, from 2 to 4, from 2 to 6, from 3 to 6 etc., as well as individual numbers within that range, for example, 1, 2, 3, 4, 5, and 6. This applies regardless of the breadth of the range.

Whenever a numerical range is indicated herein, it is meant to include any cited numeral (fractional or integral) within the indicated range. The phrases "ranging/ranges between" a first indicate number and a second indicate number and "ranging/ranges from" a first indicate number "to" a second indicate number are used herein interchangeably and are meant to include the first and second indicated numbers and all the fractional and integral numerals therebetween.

As used herein the term "method" refers to manners, means, techniques and procedures for accomplishing a given task including, but not limited to, those manners, means, techniques and procedures either known to, or readily developed from known manners, means, techniques and procedures by practitioners of the chemical, pharmacological, biological, biochemical and medical arts.

It is appreciated that certain features of the invention, which are, for clarity, described in the context of separate embodiments, may also be provided in combination in a single embodiment. Conversely, various features of the invention, which are, for brevity, described in the context of a single embodiment, may also be provided separately or in any suitable subcombination or as suitable in any other described embodiment of the invention. Certain features described in the context of various embodiments are not to be considered essential features of those embodiments, unless the embodiment is inoperative without those elements.

Although the invention has been described in conjunction with specific embodiments thereof, it is evident that many alternatives, modifications and variations will be apparent to those skilled in the art. Accordingly, it is intended to embrace all such alternatives, modifications and variations that fall within the spirit and broad scope of the appended claims.

All publications, patents and patent applications mentioned in this specification are herein incorporated in their entirety by reference into the specification, to the same extent as if each individual publication, patent or patent application was specifically and individually indicated to be incorporated herein by reference. In addition, citation or identification of any reference in this application shall not be construed as an admission that such reference is available as prior art to the present invention. To the extent that section headings are used, they should not be construed as necessarily limiting.

What is claimed is:

1. A method for producing a 3D image of a gem comprising:
defining a predetermined set of viewing angles of the gem and lighting angles;
placing the gem in a first orientation;

imaging the gem from a first subset of said set of viewing angles;

reorienting the gem is a second orientation;

further imaging the gem from a second subset of said set of viewing angles;

storing results of said imaging and said further imaging in a standard format for reading by a graphics viewing application;

determining a preferred view of said gem and also imaging said gem at said preferred view, wherein said preferred view is identified based on images.

2. The method of claim 1, wherein said defining is in accordance with a cut of said gem.

3. The method of claim 2, wherein said defining includes selecting a set of viewing angles in accordance to said cut from a plurality of sets of viewing angles, each set of said plurality of sets of viewing angles is associated with a standard cut of a gem.

4. The method of claim 1, wherein said preferred view is identified by a person examining said gem.

5. The method of claim 1, wherein said images are made by an imager of said imaging between images of said imaging.

6. The method of claim 1, wherein said preferred view is identified based on data from a sensor collected during said imaging.

7. The method of claim 1, wherein said also imaging is in addition to said imaging and said further imaging.

8. The method of claim 1, further comprising:
keeping a lighting stationary in respect to said gem during said imaging.

9. The method of claim 1, further comprising:
keeping a lighting stationary with respect to a viewing angle during said imaging.

10. The method of claim 1, further comprising:
keeping a lighting stationary in respect to said gem during said reorienting.

11. The method of claim 1, further comprising:
keeping a lighting stationary with respect to a viewing angle during said reorienting.

12. The method of claim 1
wherein said imaging results in a plurality of images of the gem in a standard format configured for a graphics viewing application, the method further comprising:
using a standard graphics routing interface to manipulate a view of said gem to an arbitrary angle and
interpolating said plurality of images using said standard graphics routine to view a viewable image of said gem at said arbitrary angle.

13. A method for producing a 3D image of a gem comprising:
defining a predetermined set of viewing angles of the gem and lighting angles;
placing the gem in a first orientation;
imaging the gem from a first subset of said set of viewing angles;
reorienting the gem is a second orientation;
further imaging the gem from a second subset of said set of viewing angles;
storing results of said imaging and said further imaging in a standard format for reading by a graphics viewing application;
determining a preferred view of said gem and
also imaging said gem at said preferred view, wherein said first subset is modified to include said preferred view.

14. A method for producing a 3D image of a gem comprising:
defining a predetermined set of viewing angles of the gem and lighting angles;
placing the gem in a first orientation;
imaging the gem from a first subset of said set of viewing angles;
reorienting the gem is a second orientation;
further imaging the gem from a second subset of said set of viewing angles;
storing results of said imaging and said further imaging in a standard format for reading by a graphics viewing application, wherein said defining is in accordance with a cut of said gem and wherein said cut is a round brilliant and said set of viewing angles includes views at 4 points across a crown of said gem.

15. The method of claim 14, wherein said set of viewing angles includes views at 16 equally spaced point around a girdle of said gem.

16. The method of claim 14, wherein said first subset includes view differentials and wherein an initial view for said imaging is selected such that a preferred view will be included in said imaging.

* * * * *